United States Patent
Owen et al.

(10) Patent No.: US 6,266,067 B1
(45) Date of Patent: Jul. 24, 2001

(54) SYSTEM AND METHOD FOR DYNAMICALLY DISPLAYING DATA RELATIONSHIPS BETWEEN STATIC CHARTS

(75) Inventors: Ronald Owen, Gilroy; Richard Yonts, San Jose, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/123,716

(22) Filed: Jul. 28, 1998

(51) Int. Cl.[7] .................................................. G06T 11/20
(52) U.S. Cl. .......................... 345/433; 345/474; 345/473
(58) Field of Search ................................... 345/440, 433, 345/326, 427, 435, 421, 441, 349, 7, 140, 335, 418, 113, 473, 474; 707/503, 509, 516; 382/128, 199, 224

(56) References Cited

U.S. PATENT DOCUMENTS

| | | | |
|---|---|---|---|
| 5,375,201 | | 12/1994 | Davoust ................................ 395/161 |
| 5,581,677 | * | 12/1996 | Myers et al. .......................... 345/440 |
| 5,581,678 | | 12/1996 | Kahn .................................... 395/140 |
| 5,634,133 | * | 5/1997 | Kelley .................................. 707/503 |
| 5,844,572 | * | 12/1998 | Schott .................................. 345/440 |
| 5,880,742 | * | 3/1999 | Rao et al. ............................. 345/440 |
| 5,883,635 | * | 3/1999 | Rao et al. ............................. 345/440 |
| 5,889,499 | * | 3/1999 | Nally et al. ............................. 345/7 |
| 5,999,193 | * | 12/1999 | Conley, Jr. et al. ................. 345/440 |
| 6,002,401 | * | 12/1999 | Baker .................................... 345/349 |
| 6,078,680 | * | 6/2000 | Yoshida et al. ....................... 382/128 |

OTHER PUBLICATIONS

"MacUser—The Mac's premier business-charting program . . . " http://www.deltapoint.com/dgpro/dg10003.htm.

"SpaceCharts—Java-based 3-Dimensional Charting Package," http://www.infospace-inc.com/docs/webchart/datacht.htm.

"DV-Xpresso," "WebXpresso," "DV-Centro Builds Visual Languages," http://www.dataviews.co.uk/html/products.htm.

"What Is WebXpresso?" http://www.dvcorp.com/webxpresso/whatis.htm.

"ImageStream Graphics and Presentation Filters 1996 Format Listing," http://www.inso.com/isformat.htm.

"Macintosh software provides wide range of formats for business, scientific, statistical data," http://deltapoint.com/dgpro/dg10001.htm.

"ImageStream Graphics and Presentation Filters," http://www.inso.com/imstream.htm.

\* cited by examiner

*Primary Examiner*—Jeffery Brier
*Assistant Examiner*—Thu-Thao Havan
(74) *Attorney, Agent, or Firm*—Sawyer Law Group LLP; Noreen A. Krall

(57) ABSTRACT

Method and system aspects for more intuitively presenting a relationship for static chart data from at least two static charts are described. In a method aspect and system for providing same, the method includes obtaining data from first and second static charts. The data from the first static chart is displayed as a beginning chart. The displayed data from the first static chart is adjusted to visually indicate a change in the data required by the data from the second static chart as an ending chart.

20 Claims, 3 Drawing Sheets

SYSTEM AND METHOD FOR DYNAMICALLY DISPLAYING DATA RELATIONSHIPS BETWEEN STATIC CHARTS

FIELD OF THE INVENTION

The present invention relates to static chart displays of stored data, and more particularly, to dynamic presentations of static chart data.

BACKGROUND OF THE INVENTION

The abundance of information generated in today's computer world is ever-increasing. Databases and spreadsheet programs assist in storing and entering data in a variety of categories. Data analysis typically utilizes some form of graphical displays of stored data. Most graphical displays represent either discrete time intervals, or a summary of chosen data from multiple time intervals.

Charts of discrete time intervals are, by nature, mere snapshots of data. These chart displays of historical data are thus difficult to view and understand in order to see trends in the data. Further, a series of related charts that display similar data but vary by some criterion, e.g., days, are tedious to view, especially when there are large numbers of them. Even if the charts are displayed across a desktop, there is no way to see the correlation among them easily, and if viewed consecutively, such as in a slide show, the display is normally choppy and difficult to control. Thus, viewers are required to remember information from each static chart/display over a large number of charts. Such requirements result in a less intuitive method of display. Summary displays are somewhat more intuitive than individual static displays. However, as summary charts, they do not usually provide the level of detail that individual static charts provide.

Accordingly, what is needed is a method and system for allowing a dynamic display of data with a sufficient level of detail and a more intuitive presentation to allow substantially instant recognition of trends. The present invention addresses such a need.

SUMMARY OF THE INVENTION

The present invention provides a method and system for more intuitively presenting a relationship for static chart data from at least two static charts. In a method aspect and system for providing same, the method includes obtaining data from first and second static charts. The data from the first static chart is displayed as a beginning chart. The displayed data from the first static chart is adjusted to visually indicate a change in the data required by the data from the second static chart as an ending chart.

The present invention provides a beneficial, meaningful way to observe data variations without having to constantly switch among displays and mentally interpolate data transitioning. Through progressive displaying of intermediate charts, the impression of continuity and an intuitive understanding of chart relationships are given. Thus, discrete steps in data collection are visualized in an easily grasped manner where time seems to flow smoothly. These and other advantages of the aspects of the present invention will be more fully understood in conjunction with the following detailed description and accompanying drawings.

DETAILED DESCRIPTION OF THE INVENTION

The present invention relates to dynamic presentations of data relationships between static charts. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
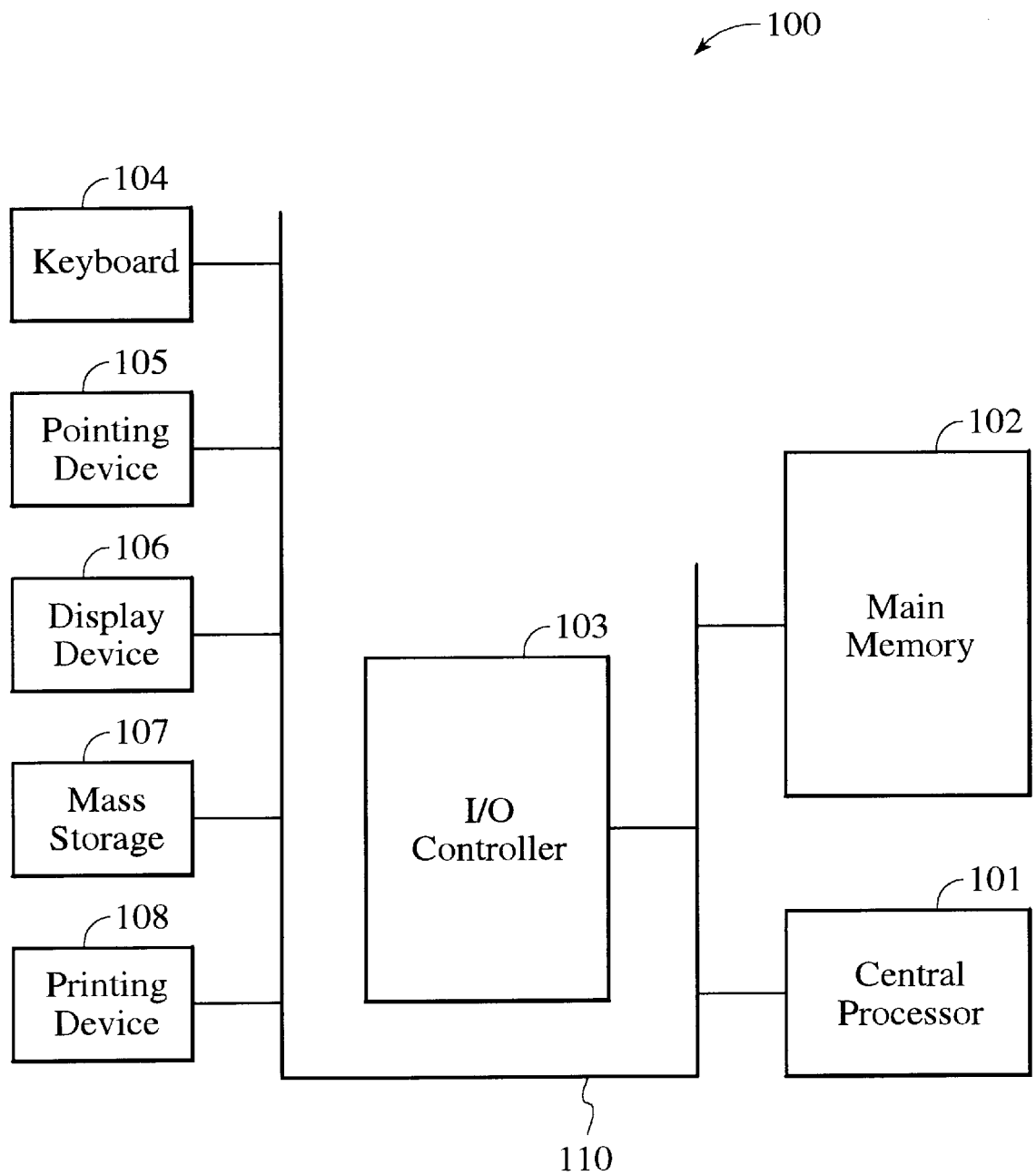
FIG. 1 illustrates a computer system suitable for embodying the present invention.

The present invention is suitably embodied in a computer system such as system 100 shown in FIG. 1 which includes: a central processor 101; a main memory 102; an input/output controller 103; a keyboard 104; a pointing device 105 (e.g., a mouse, trackball, pen device, or the like); a display device 106; and a mass storage device 107 (e.g., a hard disk). Additional input/output devices, such as a printing device 108, may be included in the system 100 as desired. As shown, the various components of system 100 communicate through a system bus 110 or similar architecture. The system 100 suitably represents an IBM-compatible personal computer system, available from a variety of vendors, including IBM Corporation, Armonk, N.Y. System 100 operates in accordance with an operating system and one or more application programs, as is well understood by those skilled in the art.

Figure 2:
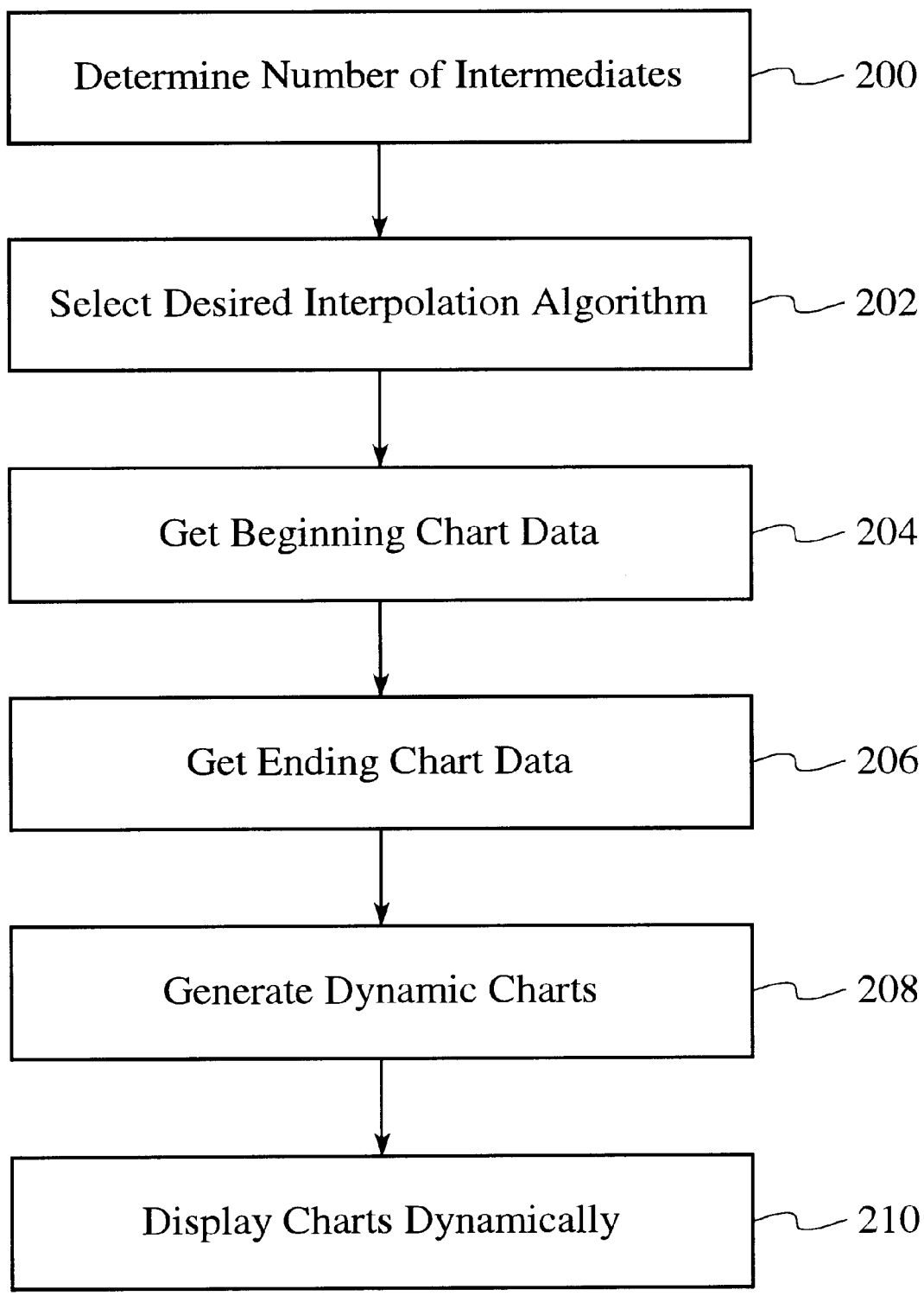
FIG. 2 illustrates a flow diagram of a process for generating dynamic charts in accordance with an embodiment of the present invention.

The present invention provides a system and method for generating dynamic charts from static data charts to more intuitively present trends exhibited by the static charts. A flow diagram of a preferred process of generating dynamic charts via a suitable programming routine from a computer readable medium is described with reference to FIG. 2, while FIGS. 3a, 3b, 3c, 3d, and 3e illustrate an example of successive charts that would provide a dynamic transition from an initial static chart (FIG. 3a) to an ending static chart (FIG. 3e). It should be appreciated that FIG. 2 illustrates one embodiment of a sequence of steps. This is meant to be illustrative of a preferred embodiment. Other sequences may be utilized to achieve the dynamic chart presentation in accordance with the present invention in which data is obtained from static charts with the display of the data from a first chart adjusted to visually indicate a change in the data required by a second chart, as described in more detail hereinbelow.

With reference to FIG. 2, a general algorithm initiates with a determination of a number of intermediate points that are to be used in generating the dynamic charts (step 200). For example, thirty points has been found to work well by the inventors, but the number chosen is design dependent, e.g., dependent upon the desired smoothness of transition, as well as the processing capabilities of a given system. For the example shown in FIGS. 3a–3e, the number of intermediate points is four. The process then continues with a selection of a desired interpolation algorithm for interpolating between points (step 202), for example, a linear interpolation algorithm. Preferably, the actual method of interpolation is selectable, either by multi-selection logic or using object-oriented technology, as is well understood by those skilled in the art. It should be appreciated, however, that while the selection of a desired algorithm allows greater flexibility in customizing how transitions occur between the intermediate points, the desired manner of performing the transition between points can be programmed directly, thus making the selection step unnecessary in such processes.

Once the number of points and interpolation algorithm are chosen, the data stored in memory, e.g., from a spreadsheet program, database, or the like in storage 107, is retrieved for the beginning static chart (step 204) and the ending static chart (step 206). Suitably, the charts have similar data in a consistent display (e.g., similar axes, scales, titles, footnotes, etc.). Based on the interpolation algorithm and number of points between the beginning and ending static charts, the intermediate charts are generated (step 208). The dynamic display then occurs (step 210) by displaying the intermediate charts successively from the beginning chart through to the ending chart. Thus, the beginning chart is displayed and overlayed by an initial intermediate chart at a specified interval avoiding flicker/visual distraction, with the overlay repeated for each next intermediate chart until the ending static chart is displayed. For a group of static charts that has more than two static charts, e.g., monthly static charts from an initial static chart of January through a final static chart of December, the ending chart of each set of two charts suitably becomes the beginning chart for a next set of two charts, and the process is repeated until all the static charts in the group have been displayed.

To make the display smooth, preferably the well-known graphics techniques of tweening and morphing are employed, where tweening suitably refers to a technique where intermediate views are created by algorithmic interpolation of points, objects pictures, etc., between a starting display and an ending display. Usually, the view is mathematically the half point between the two displays. Tweens represent static views between other static views. Morphing suitably refers to a technique where one view is gradually changed from the initial view into the target view by some technique. Usually, morphing applies to graphics (pictures) and is a dynamic process. Morphing may use tweening to determine its intermediate states but is not limited to such a technique.

In general, pseudo-code for the process of steps 204, 206, 208, and 210 illustrated in FIG. 2 is described by:
```
FOR count=1 TO number_charts-1
  generate n intermediate_charts between chart[count] and
     chart[count+1]
  display static chart[count]
  FOR index=1 TO intermediate_steps
    wait specified interval
    display intermediate_chart[index]
  END
END
wait specified time interval
display static chart[number_charts]
```
In generating the intermediate charts, the chart data is suitably represented as a matrix, e.g., a two-dimensional matrix. The following describes generation of intermediate charts in terms of pseudocode for a two-dimensional matrix.
```
BEGIN
  FOR i=1 TO shape_dimension_1
    FOR j=1 TO shape_dimension_2
      intermediate_chart[i, j]=Interpolate_data(first_
         chart[i, j],
         last_chart[i, j],
         index)
    END
  END
  return intermediate_chart
END
```
Pseudocode for the Interpolate_data is suitably described by:
```
BEGIN
  return ((second_datum-first_datum)/(intermediate_
     steps+1)×index)
END
```

Figure 3A:
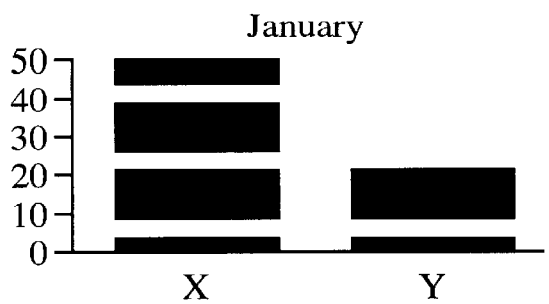
FIGS. 3a, 3b, 3c, 3d, and 3e illustrate an example of successive charts for dynamic transitioning between two static charts in accordance with the present invention.
Figure 3B:
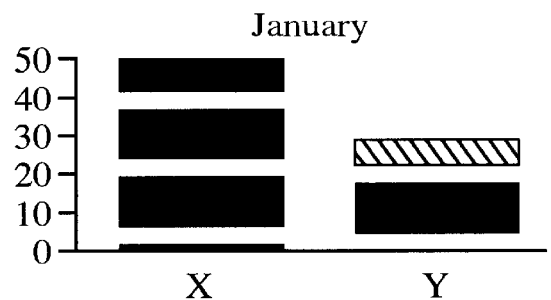
Figure 3C:
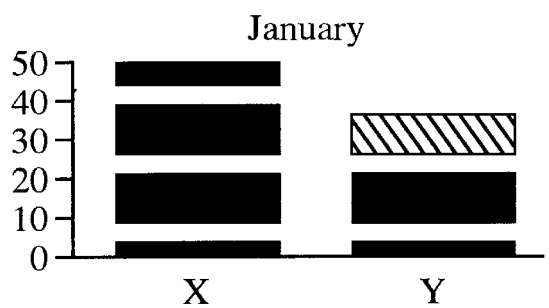
Figure 3D:
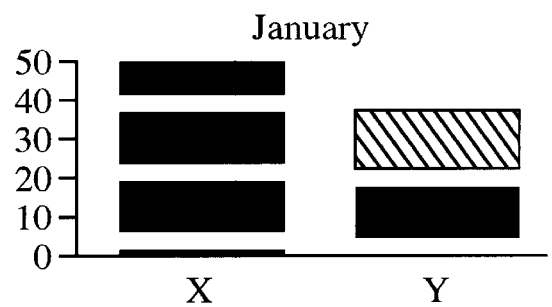
Figure 3E:
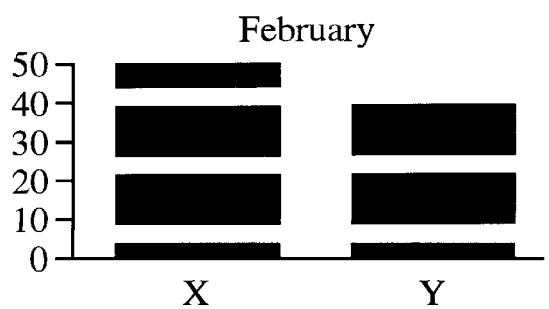

As an example with four intermediate steps between a beginning and ending static chart, FIG. 3a illustrates an initial static chart where two categories, 'X' and 'Y', are plotted, while FIG. 3e illustrates a final static chart for categories 'X' and 'Y'. In the example, the initial value for category 'Y' is 20 (FIG. 3a), and the final value for category 'Y' is 40 (FIG. 3e). Category 'X' remains unchanged. With a difference of twenty between the initial and final values of category 'Y' and a chosen number of four intermediate steps, a linear interpolation of the data results in a change of five units per intermediate step. Thus, FIG. 3b illustrates a change from twenty to twenty-five in category 'Y', FIG. 3c illustrates a change from twenty-five to thirty, FIG. 3d illustrates a changes from thirty to thirty-five, and FIG. 3e illustrates the final change from thirty-five to forty, with the change in value demonstrated by the dashed areas in the FIGS. 3b, 3c, and 3d. Of course, the dashing is meant to more distinctively represent the effect of the interpolated steps in the figures, but these dashed areas would not be displayed as such in an actual display. While it is difficult to fully represent the dynamic nature of a display from the initial static chart of FIG. 3a to the final static chart of FIG. 3e through sequential figures, when the charts of FIGS. 3a–3e are displayed, one overlaying the previous, an animated view is created in which the value of 'Y' grows from 20 to 40.

Thus, with the present invention, a relationship between static charts for all related information is more effectively presented. Dynamic charts display the information on one view by progressively overlaying older views with newer ones. Data can be interpolated between actual points by any numerical method preferred.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for more intuitively presenting a relationship for static chart data from at least two static charts, the method comprising:

obtaining data from first and second static charts, wherein the first and second static charts have similar data in a consistent display;

displaying data from the first static chart as a beginning chart;

adjusting the displayed data from the first static chart, wherein the adjusting further comprises generating intermediate charts; and overlaying the display with each generated intermediate chart until the second static chart is displayed, visually and dynamically indicating the change in data between the first and second static charts.

2. The method of claim 1 wherein adjusting further comprises:
   determining a number of steps desired between the first and second static charts; and
   selecting an interpolation algorithm to process changes in data between the first and second static charts.

3. The method of claim 2 wherein obtaining data further comprises retrieving data for the first static chart from memory; and
   retrieving data for the second static chart from memory.

4. The method of claim 3 wherein adjusting further comprises generating intermediate charts from the retrieved data wherein the number of steps desired determines a number of intermediate charts generated.

5. The method of claim 4 wherein overlaying occurs at predetermined intervals.

6. The method of claim 2 wherein the interpolation algorithm comprises a linear interpolation algorithm.

7. The method of claim 1 wherein the second static chart becomes a beginning chart for a subsequent chart when more than two static charts of data are utilized.

8. The method of claim 1 wherein the data in the first and second static charts comprises related data for a given category.

9. A system for more intuitively presenting a relationship for static chart data from at least two static charts, the system comprising:
   memory storage for storing data from at least two static charts;
   a display for displaying the stored data; and
   a processor coupled to the display and to the memory storage for supporting a process of obtaining data from first and second static charts stored in memory, wherein the first and second static charts have similar data in a consistent display, displaying the data from the first static chart as a beginning chart on the display, adjusting the displayed data from the first static chart, wherein the adjusting further comprises generating intermediate charts, and overlaying the display with each generated intermediate chart until the second static chart is displayed to dynamically display a change in the data from the first static chart to the second static chart.

10. The system of claim 9 wherein adjusting further comprises:
    determining a number of steps desired between the first and second static charts; and
    selecting an interpolation algorithm to process changes in data between the first and second static charts.

11. The system of claim 10 wherein obtaining data further comprises retrieving data for the first static chart from the memory storage, and retrieving data for the second static chart from the memory storage.

12. The system of claim 11 wherein adjusting further comprises generating intermediate charts from the retrieved data wherein the number of steps desired determines a number of intermediate charts generated.

13. A method for dynamically displaying a change in data between two static charts, each of the static charts representing similar data in a consistent display, the method comprising:
    determining a number of intermediate charts between first and second static charts;
    retrieving data for the first static chart;
    retrieving data for the second static chart;
    generating the number of intermediate charts;
    displaying the first static chart; and
    overlaying the display with each generated intermediate chart until the second static chart data is displayed to dynamically and visually display a change in the data from the first static chart to the second static chart.

14. The method of claim 13 further comprising selecting an interpolation algorithm after the step of determining.

15. The method of claim 14 wherein the selected interpolation algorithm comprises a linear interpolation algorithm.

16. The method of claim 14 wherein the selected interpolation algorithm determines the generation of the intermediate charts.

17. The method of claim 13 wherein overlaying occurs through tweening and morphing techniques.

18. A method for more intuitively presenting a relationship for static chart data from at least two static charts, each of the static charts representing similar data in a consistent display, the method comprising:
    obtaining data from first and second static charts, wherein obtaining further comprises:
      retrieving data for the first static chart from memory; and
      retrieving data for the second static chart from memory;
    displaying data from the first static chart as a beginning chart;
    adjusting the displayed data from the first static chart, wherein adjusting further comprises:
      determining a number of steps desired between the first and second static charts;
      selecting an interpolation algorithm to process changes in data between the first and second static charts;
      generating intermediate charts from the retrieved data wherein the number of steps desired determines a number of intermediate charts generated; and
    displaying the intermediate charts through overlaying of one intermediate chart over another to visually indicate the change in data from the first static chart to the second static chart, wherein overlaying occurs at predetermined intervals.

19. A method for more intuitively presenting a relationship for static chart data from at least two static charts, each of the static charts representing similar data in a consistent display, the method comprising:
    obtaining data from first and second static charts;
    displaying data from the first static chart as a beginning chart; and
    adjusting the displayed data from the first static chart to visually indicate a change in the data required by the data from the second static chart as an ending chart, wherein the second static chart becomes a beginning chart for a subsequent chart when more than two static charts of data are utilized.

20. A system for more intuitively presenting a relationship for static chart data from at least two static charts, each of the static charts representing similar data in a consistent display, the system comprising:
    memory storage for storing data from at least two static charts;
    a display for displaying the stored data; and
    a processor coupled to the display and to the memory storage for supporting a process of obtaining data from first and second static charts stored in memory, wherein obtaining further comprises retrieving data for the first static chart from memory, and retrieving data for the second static chart from memory; displaying the data from the first static chart as a beginning chart on the display; adjusting the displayed data from the first static chart to visually indicate a change in the data required by the data from the second static chart to display an ending chart on the display, wherein adjusting further comprises:

determining a number of steps desired between the first and second static charts;

selecting an interpolation algorithm to process changes in data between the first and second static charts; and generating intermediate charts from the retrieved data wherein the number of steps desired determines a number of intermediate charts generated; and displaying the intermediate charts through overlaying of one intermediate chart over another to visually indicate the change in data between the intermediate charts.

* * * * *